United States Patent Office 3,649,696
Patented Mar. 14, 1972

3,649,696

NEW PHOTOCHROMIC COMPOUNDS (OXY AND OXYALKYLENE BRIDGES)

John Kazan, Jr., Bridgewater Township, Somerset County, N.J., assignor to American Cyanamid Company, Stamford, Conn.

No Drawing. Filed May 16, 1968, Ser. No. 729,521
Int. Cl. C07c 49/82
U.S. Cl. 260—591 1 Claim

ABSTRACT OF THE DISCLOSURE

A class of photochromic compounds characterized by the formula:

$$A—(CH_2)_m—O—(CH_2)_n—B$$

wherein *m* and *n* are each 0 or 1–4, A is a moeity of an aromatic compound $A(CH_2)_mOH$ having an efficient rate of intersystem crossing from the singlet state to the triplet state, and B is the moiety of an aromatic compound $B(CH_2)_nOH$ having the first triplet state below the first triplet state of $A(CH_2)_mOH$.

This invention relates to and has for its object the provision of a new class of photochromic organic compounds represented by the Formula I:

$$A—(CH_2)_m—O—(CH_2)_n—B \quad \text{I}$$

wherein *m* and *n* are each 0 or 1–4, A is a moiety of an aromatic compound $A(CH_2)_mOH$ having an efficient rate of intersystem crossing and B is a moiety of an aromatic compound $B(CH_2)_nOH$ having the first triplet state below (i.e., at lower energy than) the first triplet state of $A(CH_2)_mOH$. Also, it is advantageous for the first excited singlet of $B(CH_2)_nOH$ to be above the first singlet state of $A(CH_2)_mOH$.

When *m* and *n* are both 0, $A(CH_2)_mOH$ and $B(CH_2)_nOH$ become A—OH and B—OH, respectively, and Formula I becomes A—O—B. When *m* is 1 and *n* is 0, $A(CH_2)_mOH$ and $B(CH_2)_nOH$ become $A—CH_2OH$ and B—OH, respectively, and Formula I becomes $A—CH_2—O—B$. When *m* is 0 and *n* is 1, $A(CH_2)_mOH$ and $B(CH_2)_nOH$ becomes A—OH and $B—CH_2OH$, respectively, and Formula I becomes $A—O—CH_2—B$. When *m* and *n* are both 1, Formula I becomes $A—CH_2—O—CH_2—B$.

In the above, Compound $A(CH_2)_mOH$ and moiety A derived therefrom, undergo a transition to the first excited singlet state upon exposure to light having a wavelength from 200–2000 millimicrons. Compound $A(CH_2)_mOH$, upon absorbtion of light in the stated range, must have a high inter-system crossing efficiency between the first excited singlet state and the lowest triplet state. Compound $B(CH_2)_nOH$, from which moiety B is derived, must have a lowest triplet state at a lower energy level than the lowest triplet state of Compound $A(CH_2)_mOH$; furthermore, the energy difference between the first triplet level and the higher triplet level of Compound $B(CH_2)_nOH$ must be different from the energy difference between the ground state and the first excited singlet state of Compound $A(CH_2)_mOH$.

The advantages of photochromic compounds of this invention are: (1) rapid color development or change when irradiated by light and rapid color decay when the light is removed, and (2) increased intensity of the developed color due to great efficiency of energy transfer from one moiety to the other.

The compounds of this invention have many uses, such as in sunglasses, welding goggles, skylights, automobile windows and windshields, windows for buildings and dwellings, windows for space vehicles and aircraft, paints and surface coatings for novelty effects, energy measuring devices, etc.

The mechanism of the photochromic effect of the present invention requires that under light of a given wavelength, one fragment of the photochromic molecule "$A—(CH_2)_m—O—(CH_2)_n—B$" absorbs and is "activated," while the other fragment is not so-activated. The fragment which absorbs the incident light, known herein as the "donor" portion of the molecule, after absorption undergoes intersystem crossing from the excited singlet level to the triplet level and then transfers energy from its triplet level to the acceptor fragment.

The donor fragment, A, may be a complex system containing an acceptor moiety, B′ (which may or may not be the same as B), but still retaining the capability of donating energy to the acceptor moiety B. The acceptor fragment in its lowest triplet level absorbs light in the range of 200–2,000 millimicrons and is converted to a higher triplet state.

The acceptor fragment, B, may be a complex system containing a donor moiety, A′ (which may or may not be the same as A), but still retaining the capability of accepting energy from the donor moiety A.

The absorption of light by the acceptor fragment in its triplet state is observed as color, which disappears when the light source is removed. This is the photochromic effect. In essence, therefore, the present invention provides a means for converting the acceptor fragment to a form, namely its lowest triplet state, which is capable of absorbing light in the range of 200–2,000 millimicrons. The donor portion thus acts as an activator for the acceptor portion, so that the latter is converted to its light-absorbing triplet state.

In summary, a triplet-triplet photochromic system is obtained by incorporating in a non-opaque substrate, a compound having specific acceptor and specific donor moieties, neither one of the compounds corresponding to the said moieties having been expected to exhibit useful or substantial photochromism when used individually. One moiety (the acceptor) has a long-lived triplet state and an excited singlet state which does not convert readily into this triplet state. The other moiety (the donor) is easily converted from an excited singlet to a triplet of greater energy than the acceptor triplet. The energy of the donor triplet is efficiently transferred to the acceptor moiety, thereby forming the long-lived acceptor triplet. The absorption spectrum of the acceptor triplet is the source of photochromism. The excited singlet state of the donor is obtainable either by direct absorption of light or by transferral of energy from a more energetic excited singlet state of the donor or acceptor.

The present invention includes the use of compounds in which the acceptor moiety is deuterated. Deuterated derivatives exhibit first triplet states with longer lifetimes which will give a higher concentration of molecules in this triplet state and may thus be preferred if the undeuterated compound does not give sufficient absorption intensity during exposure to light.

As will be noted, the compounds "$A(CH_2)_mOH$" and "$B(CH_2)_nOH$" and, consequently, the fragments A and B may be substituted by substituents such as alkyl radicals of one to eighteen carbons, alkoxy radicals of one to eighteen carbons, halo radicals (e.g., chlorine and fluorine), amino radicals such as dialkylamino groups, alkanamido groups, and the like. It may be desirable in many cases to have various substituents on the A or B fragment to aid in dissolving the photochromic compound in the substrate in which it is to be used, since some of the unsubstituted compounds are relatively insoluble in most conventional solvents. Long chain alkyl or alkoxy groups in many cases overcome this difficulty.

The compounds of this invention may be incorporated in non-opaque substrates capable of transmitting light in the range of 200 to 2,000 millimicrons. The nature of the substrate may vary considerably over a broad class of compositions ranging from fluids to solids. The solids may be either crystalline or amorphous, among the most suitable being glasses and polymeric materials.

The glasses include low temperature glasses derived from organic solvents, such as 2-methyltetrahydrofuran, methylcyclohexane, and ether-pentane-alcohol; inorganic glasses such as phosphate glasses and borate glasses are also suitable. When liquid substrates are used, the lifetime of the B triplet level is usually short, so that the photochromic effect can be detected only instrumentally.

The polymeric materials which may be used in this invention include a wide range of polymeric materials which exist today. For many purposes, the polymeric material should have optical transparency. A lack of color is also desirable. The polymeric materials include thermoplastics such as polyacrylates, polymethacrylates, cellulose acetate, cellulose propionate, cellulose acetate-butyrate, cellulose nitrate, ethyl cellulose, polycarbonates, polyacrylonitrile, polyamides, polystyrene, poly(methylstyrenes), poly(chloromethylstyrenes), poly(styrene-butadiene), poly(vinyl acetate), poly(vinyl acetals), poly(vinyl chloride), poly(vinyl butyral), poly(vinyl formal), chlorinated polyethers and silicones; and thermosetting resins such as phenol-formaldehyde condensates, melamine-formaldehyde condensates, polyester-styrene combinations, polyurethanes, epoxies, and copolymers and mixtures thereof.

Triplet molecules are also known as biradicals because they possess two unpaired electrons. As such, they are extremely reactive and interact with each other, with oxygen, or with any paramagnetic species. Thus, it is advantageous to employ a polymeric matrix of good optical clarity that is free from residual monomer, plasticizers, and atoms, molecules, ions or molecular fragments capable of reacting rapidly with the metastable triplet state entities which govern the photochromic effects herein disclosed.

The photochromic material is uniformly dispersed throughout the plastic matrix. This can be done by adding the compound to the monomer or monomers followed by polymerization; by dissolving the polymer and photochromic compound in a solvent and casting a rigid sheet, film or other form; by milling the photochromic combination of compounds with the polymeric material, etc. The photochromic compound can also be applied to the formed plastic article.

The photochromic effect is a function of the concentration of the photochromic compound, the thickness of the substrate and the intensity of the exciting radiation. Given adequate light intensity the effect increases with increasing concentration and also increases with increasing thickness. For a given concentration and thickness, the effect increases with increasing light intensity up to the saturation value.

The amount of the photochromic compound to be used in the compositions of the invention may range from 0.0001 to 2.0% based on the amount of non-opaque substrate. In normal practice, at least 0.0001%, preferably at least 0.05% of the photochromic compound is employed.

A preferred class of compounds of this invention has the following Formula II:

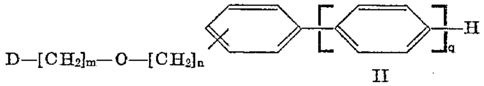

II wherein $m$ and $n$ are as defined above, $q$ is an integer equal to or greater than 1 (e.g., between 1 and 4) and D is a member of the group consisting of

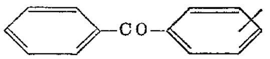

III

Moiety of benzophenone

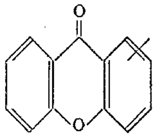

IV

Moiety of xanthone

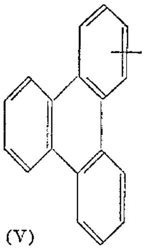

(V)

Moiety of triphenylene and when $m$ is 1,

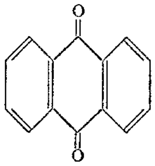

VI

Moiety of anthraquinone

The compounds of Formula I can be prepared by conventional methods.

When $m$ and $n$ are both zero (compounds of Formula Ia), the compounds can be prepared by reacting an hydroxy compound (Formulae VII and X) with a halo compound (Formulae VIII and IX), according to reactions (1) and (2).

(1) $\underset{VII}{A{-}OH} + \underset{VIII}{\text{hal-}B} \longrightarrow \underset{Ia}{A{-}O{-}B} + \text{H-hal}$ (2) $\underset{IX}{A\text{-hal}} + \underset{X}{HO{-}B} \longrightarrow \underset{Ia}{A{-}O{-}B} + \text{H-hal}$ It is advantageous to carry out the reaction in an inert solvent and in the presence of an acid binder such as potassium carbonate or a tertiary amine, and a catalyst such as copper or copper oxide.

When $m$ or $n$ is 1–4 and the other is 0, the compounds of Formulae Ib and Ic can be prepared by reacting a haloalkyl compound (Formulae XI and XII) with an hydroxy compound (Formulae VII and X) according to reactions (3) and (4).

(3) $\underset{XI}{A{-}(CH_2)_m\text{-hal}} + \underset{X}{HO{-}B} \longrightarrow \underset{Ib}{A{-}(CH_2)_m{-}O{-}B} + \text{H-hal}$ (4) $\underset{VII}{A{-}OH} + \underset{XII}{\text{hal-}(CH_2)_n{-}B} \longrightarrow \underset{Ic}{A{-}O{-}(CH_2)_n{-}B} + \text{Hal}$ It is adantageous to carry out reactions (3) and (4) in an inert solent and in the presence of an acid binder, such as potassium carbonate.

When both $m$ and $n$ are 1–4, the compounds of Formula Id can be prepared by reacting a halo-alkyl compound (Formulae XI and XII) with a hydroxy-alkyl compound (Formulae XIII and XIV) according to reactions (5) and (6).

(5)

$$\underset{XI}{A-(CH_2)_m\text{-hal}} + \underset{XIII}{HO-(CH_2)_n-B}\ \underset{Id}{A-(CH_2)_m-O-(CH_2)_n-B} + H\text{-hal}$$

(6)

$$\underset{XIV}{A-(CH_2)_m-OH} + \underset{XII}{\text{hal-}(CH_2)_n-B}\ \underset{Id}{A-(CH_2)_m-O-(CH_2)_n-B} + H\text{-hal}$$

In reactions (5) and (6), sodium salts of the hydroxy compounds are reacted with the halo compounds in an inert solvent.

When reaction (1) is used to prepare compounds of Formula I, suitable hydroxy compounds of Formula VII include 2-hydroxybenzophenone, 2-hydroxy-4-methoxybenzophenone, 3-hydroxybenzophenone, 4-hydroxybenzophenone, 4-hydroxy-3′-methylbenzophenone, 4-hydroxy 3′ - methoxybenzophenone, 2 - hydroxyxanthone, 3 - hydroxyxanthone, 3-hydroxy-5-methylxanthone, 1-hydroxytriphenylene, 2-hydroxytriphenylene, etc.; and suitable halo compounds of Formula VIII include 3-bromobiphenyl, 4-bromo-4′-methylbiphenyl, 4-bromo-p-terphenyl, 4-chloro-p-terphenyl, 4-iodo-p-terphenyl, 4 - iodo-3,3″-dimethyl-p-terphenyl, 4-iodo-p-quaterphenyl, 4-iodo-2″,3,3′,3″-tetramethyl-p-quaterphenyl, etc.

When reaction (2) is used to prepare compounds of Formula I, suitable halo compounds of Formula IX include 3-bromobenzophenone, 4-bromobenzophenone, 4-bromo-4′-fluorobenzophenone, 4-chloro-2′,3′-dimethoxybenzophenone, 4-chloro-4-methylbenzophenone, 2-chloroxanthone, 3-chloroxanthone, 1-bromo-4-methylxanthone, etc.; and suitable hydroxy compounds of Formula X include 3-hydroxybiphenyl, 4-hydroxy-biphenyl, 3-hydroxy-p-terphenyl, 4-hydroxy-p-terphenyl, etc.

When reaction (3) is used to prepare compounds of Formula I, suitable halo-alkyl compounds of Formula XI include 4-(bromomethyl)benzophenone, 4-(3-bromopropyl)benzophenone, 2-(bromomethyl)anthraquinone, 2-(bromomethyl)-1,3,4-trimethoxyanthraquinone, 2-(chloromethyl)triphenylene, etc.; and suitable hydroxy compounds of Formula X include 3-hydroxybiphenyl, 4-hydroxybiphenyl, 3-hydroxy-p-terphenyl, 4-hydroxy-p-terphenyl, etc.

When reaction (4) is used to prepare compounds of Formula I, suitable hydroxy compounds of Formula VII include 3 - hydroxybenzophenone, 4 - hydroxybenzophenone, 4-hydroxy-3′-methylbenzophenone, 4-hydroxy-3′-methoxybenzophenone, 2-hydroxyxanthone, 3-hydroxyxanthone, 3-hydroxy-5-methylxanthone, 1-hydroxytriphenylene, 2-hydroxytriphenylene, etc.; and suitable halo-alkyl compounds of Formula XII include 4-(bromomethyl)biphenyl, 4-(2-bromoethyl)biphenyl, etc.

When reaction (5) is used to prepare compounds of Formula I, suitable halo-alkyl compounds of Formula XI include 4-(bromomethyl)benzophenone, 4-(3-bromopropyl)benzophenone, 2 - (bromomethyl)anthraquinone, 2 - (bromomethyl) - 1,3,4 - trimethoxyanthraquinone, 2-(chloromethyl)triphenylene, etc.; and suitable hydroxyalkyl compounds of Formula XIII include 4-biphenylmethanol, 4-biphenylethanol, p-terphenyl-4-ethanol, etc.

When reaction (6) is used to prepare compounds of Formula I, suitable hydroxy-alkyl compounds of Formula XIV include 4-(hydroxymethyl)benzophenone, 4-(3 - hydroxypropyl)benzophenone, 2 - (hydroxymethyl) anthraquinone, 2-triphenylenemethanol, etc.; and suitable halo-alkyl compounds of Formula XII include 4-(bromomethyl)biphenyl, 4-(2-bromoethyl)biphenyl, etc.

Similar methods can be used to provide compounds containing two donor moieties and one acceptor moiety or one donor moiety and two acceptor moieties. For example, a halo compound of Formula IX is reacted with a dihydroxy compound, such as p-terphenyl-4,4″-diol, or a dihalo compound, such as 4,4′-dibromobenzophenone, is reacted with a hydroxy compound of Formula X.

Representative products of Formula I which may be made by reactions (1) and (2) include 4-(3-biphenylyloxy)benzophenone, 3-(4-biphenylyloxy)benzophenone, 4-(p-terphenyl-4-yloxy)benzophenone, 4-(p-quaterphenyl-4-yloxy)benzophenone, 3-(p-terphenyl-3-yloxy)xanthone, 2-(p-terphenyl-4-yloxy)triphenylene, etc.

Representative products of Formula I which may be made by reaction (3) include 4-(3-biphenylyloxymethyl) benzophenone, 4-(p-terphenyl-4-yloxymethyl)benzophenone, 2-(p-terphenyl-3-yloxymethyl)anthraquinone, 2-(p-terphenyl-4-yloxymethyl)triphenylene, etc.

Representative products of Formula I which may be made by reaction (4) include 3-(4-biphenylmethoxy) benzophenone, 3-(4-biphenylylmethoxy)xanthone, 2-(4-biphenylmethoxy)triphenylene, etc.

Representative products of Formula I which may be made by reactions (5) and (6) include 4-(4-biphenylylmethoxymethyl)benzophenone, 4 - [2-(4-biphenylyl)ethoxymethyl]anthraquinone, 4 - [3-(4-biphenylylmethoxy) propyl]benzophenone, etc.

The following examples are presented to further illustrate the present invention.

EXAMPLE 1

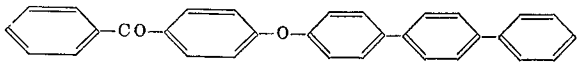

A mixture of 5.94 g. (0.03 mole) 4-hydroxybenzophenone and 1.12 g. (0.02 mole) potassium hydroxide is heated at 280–290° C. in an atmosphere of nitrogen until the water formed is removed. To the melt there is added 0.1 g. copper powder and 3.70 g. (0.01035 mole) 4-iodo-p-terphenyl, and the mixture is heated at 330–340° C. for six hours. The cooled and solidified melt is ground and triturated with hot 30% potassium hydroxide. The residue is dissolved in hot chloroform and the filtrate is evaporated. After recrystallization from chlorobenzene and from butyl acetate the material is chromatographed on alumina using chloroform as the eluent is recrystallized again from chloroform. The colorless crystalline product, 4-(p-terphenyl-4-yloxy)benzophenone, melts at 245.5–247.5° C.

When the procedure is repeated substituting an equivalent amount of 4-bromo-4′-methylbiphenyl for the 4-iodo-p-terphenyl, the product is 4-(4′-methyl-4-biphenylyloxy)benzophenone.

When the procedure is repeated substituting an equivalent amount of 4-iodo-p-quaterphenyl for the 4-iodo-p-terphenyl, the product is 4-(p-quaterphenyl-4-yloxy) benzophenone.

EXAMPLE 2

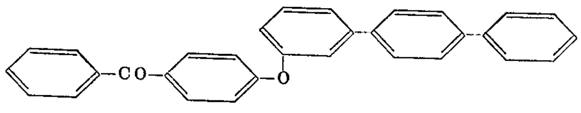

A mixture of 1.23 g. 3-hydroxy-p-terphenyl, 1.5 g. 4-bromobenzophenone, 25 ml. dimethylformamide, 0.9 g. potassium carbonate and 0.1 g. copper powder is boiled under reflux for 24 hours. The mixture is cooled, filtered and poured into water. The resulting precipitate is dissolved in methylene chloride, and the solution is washed with aqueous sodium carbonate. The solvent is evaporated and the residue is washed with ethyl alcohol. Chromatography is then carried out on an alumina column using benzene as the eluent. The central colorless band is separated and recrystallized from butanol. The product, 4-(p-terphenyl-3-yloxy)benzophenone, melts at about 120–121° C. and shows phosphorescence at 4931 A.

When the procedure is repeated substituting an equivalent amount of 4-bromo-4′-fluorobenzophenone for the 4-bromobenzophenone, the product is 4'-fluoro-4-(p-terphenyl-3-yloxy)benzophenone.

EXAMPLE 3

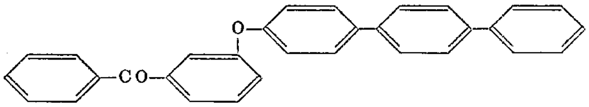

A mixture of 3.1 g. (0.010 mole) 4-bromo-p-terphenyl, 2.2 g. (0.011 mole) 3-hydroxybenzophenone, 0.5 g. cuprous oxide, 45 ml. 2,4,6-collidine and 0.75 g. sodium iodide is refluxed for five days. The cooled mixture is poured into dilute hydrochloric acid and the resulting precipitate is separated by filtration, washed with water and dried. The precipitate is extracted with benzene and from the benzene solution, by addition of petroleum ether, there is obtained the desired product, 3-(p-terphenyl-4-yloxy)benzophenone, which, after purification by chromatography on alumina and recrystallization from isopropyl alcohol, appears as white crystals melting at 134–135° C.

When the procedure is repeated substituting 4-hydroxy-3'-methoxybenzophenone for the 3-hydroxybenzophenone, the product is 3'-methoxy-4-(p-terphenyl-4-yloxy)benzophenone.

EXAMPLE 4

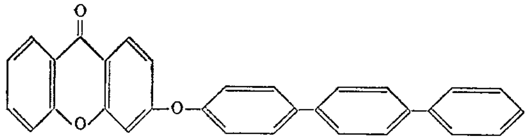

A mixture of 2.33 g. (0.011 mole) 3-hydroxyxanthone, 3.70 g. (0.0104 mole) of 4-iodo-p-terphenyl, 0.86 g. (0.006 mole) cuprous oxide and 4 ml. 2,4,6-trimethylpyridine is refluxed in an atmosphere of nitrogen for 72 hours. The precipitate resulting from the addition of the reaction mixture to 400 ml. dilute hydrochloric acid is separated by filtration and triturated with methylene chloride, and with hot chloroform. The chloroform solution is washed repeatedly with 5 N hydrochloric acid, 2.5 N sodium hydroxide and saturated aqueous sodium chloride solution. The residue from the evaporation of the chloroform is chromatographed on alumina using benzene and chloroform as eluents. The intermediate fractions are combined and recrystallized from butanol and then from chlorobenzene. The colorless, crystalline product, 3-(p-terphenyl-4-yloxy)xanthone, melts at 229–230° C.

When the procedure is repeated substituting an equivalent amount of 2-hydroxyxanthone for the 3-hydroxyxanthone, the product is 2-(p-terphenyl-4-yloxy)xanthone.

EXAMPLE 5

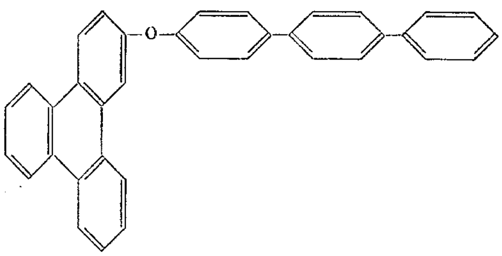

The procedure of Example 1 is repeated substituting an equivalent amount of 2-hydroxytriphenylene for the 4-hydroxybendophenone. The product is 2-(p-terphenyl-4-yloxy)triphenylene.

EXAMPLE 6

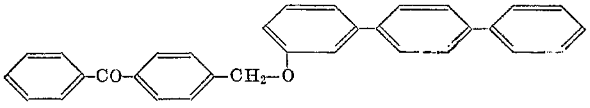

A mixture of 1.6 g. (0.0065 mole) 3 - hydroxy-p-terphenyl, 1.91 g. (0.0069 mole) 4-(bromomethyl)benzophenone, and 1.11 g. (0.008 mole) potassium carbonate is refluxed for 22 hours and the resulting mixture is poured into aqueous sodium chloride solution. The precipitate is dissolved in chloroform and the solution is dried and evaporated. The residue is chromatographed on alumina using benzene as the eluent. The intermediate fraction is crystallized from butanol and methylcyclohexane. The colorless product, 4-(p-terpenyl - 3 - yloxymethyl)benzophenone, melts at 146–148° C.

When the procedure is repeated substituting an equivalent amount of 4-(3-bromopropyl)benzophenone for the 4-(bromomethyl)benzophenone, the product is 4-[3-(p-terphenyl-3-yloxy)propyl]-benzophenone.

When the procedure is repeated substituting an equivalent amount of p-terphenyl-4,4"-diol for the 3-hydroxy-p-terphenyl, the product is 4,4"-bis(4-benzoylbenzyloxy)-p-terphenyl.

EXAMPLE 7

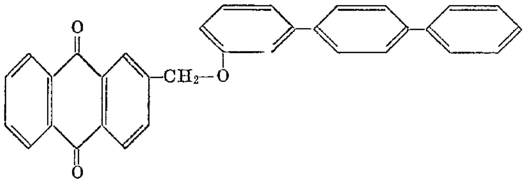

A mixture of 2.0 g. (0.00664 mole) 2-(bromomethyl)-anthraquinone 1.6 g. (0.00671) mole) 3-hydroxy-p-terphenyl, 0.926 g. (0.00671 mole) potassium carbonate and 200 ml. 75% aqueous acetone is refluxed for 24 hours. Additional water is added and acetone is evaporated. The resulting precipitate is separated by filtration, washed with water and acetone and dried. The desired product is obtained after recrystallization from chlorobenzene and butyl acetate-chlorobenzene. The product, 2-(p-terphenyl-3-yloxymethyl)anthraquinone, appears as yellow crystals melting at 258–259° C.

EXAMPLE 8

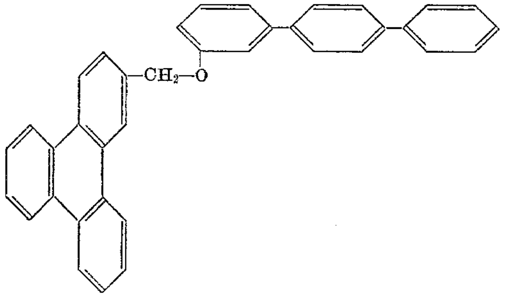

The procedure of Example 7 is repeated substituting an equivalent amount of 2-(chloromethyl)triphenylene for the 2-(bromomethyl)anthraquinone. The product is 2-(p-terphenyl-3-yloxymethyl)triphenylene.

EXAMPLE 9

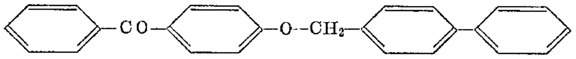

The procedure of Example 7 is repeated substituting equivalent amounts of 4-(bromomethyl)biphenyl and 4-hydroxybenzophenone for the 2-(bromomethyl)anthraquinone and 3-hydroxy-p-terphenyl, respectively. The product is 4-(4-biphenylylmethoxy)benzophenone.

When the procedure is repeated substituting an equivalent amount of 4-(2-bromoethyl)biphenyl for the 4-

(bromomethyl)biphenyl, the product is 4-[2-(4-biphenylyl)ethoxy]benzophenone.

EXAMPLE 10

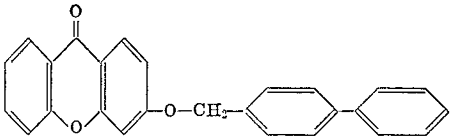

The procedure of Example 9 is repeated substituting 3-hydroxyxanthone for the 4-hydroxybenzophenone. The product is 3-(4-biphenylylmethoxy)xanthone.

EXAMPLE 11

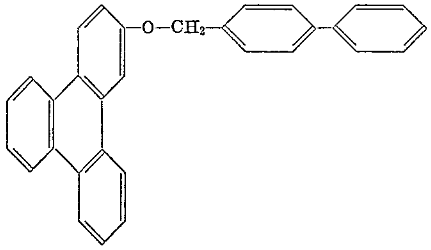

The procedure of Example 9 is repeated substituting 2-hydroxytriphenylene for the 4-hydroxybenzophenone. The product is 2-(4-biphenylmethoxy)triphenylene.

EXAMPLE 12

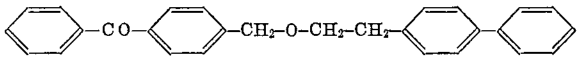

4-biphenylethanol (99 g., 0.5 mole) is slowly added to a mixture of 11.5 g. (0.5 atom) powdered sodium and 500 ml. of toluene. When the evolution of hydrogen ceases, 138 g. (0.5 mole) 4-bromomethylbenzophenone is added and the mixture is refluxed for about 1 hour. After adding water and separating the organic layer, the product, 4-[2-(4-biphenylyl)ethoxymethyl]benzophenone, is isolated from the organic layer.

EXAMPLE 13

A $10^{-5}$ molar solution of 4-(p-terphenyl-4-yloxy)-benzophenone (product of Example 1) in tetrahydrofuran is freed of oxygen by repeatedly shaking in an atmosphere of argon. The solution is transferred to an optical cell (approximately 1 cm. in dia. x 14 cm. long). When the cell is illuminated coaxially by a 250 joule flash, a very strong transient absorption appears at about 4850 A.

EXAMPLE 14

The procedure of Example 13 is repeated substituting 3-(p-terphenyl-4-yloxy)benzophenone, the product of Example 3, for the 4-(p-terphenyl-4-yloxy)benzophenone and methylcyclohexane for the tetrahydrofuran. The absorption appears at about 4600 A.

EXAMPLE 15

The procedure of Example 13 is repeated substituting 3-(p-terphenyl-4-yloxy)xanthone, the product of Example 4, for the 4-(p-terphenyl-4-yloxy)benzophenone and methylcyclohexane for the tetrahydrofuran. The absorption appears at about 4775 A.

EXAMPLE 16

To a solution of 0.1 g. 2-(p-terphenyl-3-yloxymethyl) anthraquinone, the product of Example 7, in a mixture of about 46.5 g. inhibitor-free methyl methacrylate monomer and about 2.5 g. ethylene dimethacrylate, there is added 0.01% of azobisisobutyronitrile, based on the weight of the monomer. After degassing to a pressure equivalent to less than $10^{-5}$ mm. of mercury, polymerization is allowed to take place in a cylindrical mold, first at 50° C. for 12 hours and then at 80° C. for 72 hours. The rough cylinder of poly(methyl methacrylate) is machined to a right cylinder 4 cm. long x 2 cm. dia. The ends of the cylinder are polished to provide an optical finish.

When exposed to sunlight or the radiation of an RS-type sunlamp, the polymer changes from colorless to yellow.

I claim:

1. The compound 4-(p-terphenyl - 4 - yloxy)benzophenone.

References Cited

FOREIGN PATENTS 1,052,683 12/1966 Great Britain -------- 260—591

DANIEL D. HORWITZ, Primary Examiner

U.S. Cl. X.R.

260—37 PC, 37 P, 335, 396 R, 383, 612 R, 649 R; 49—25; 354—45; 350—160 R

UNITED STATES PATENT OFFICE
CERTIFICATE OF CORRECTION

Patent No. 3,649,696 Dated March 14, 1972

Inventor(s) John Kazan

It is certified that error appears in the above-identified patent and that said Letters Patent are hereby corrected as shown below:

Column 4, line 71 "solent" should be -- solvent --.
Column 6, line 15 "biphenylmethoxy" should be -- biphenylylmethoxy --.
Column 7, line 66 "hydroxybendophenone" should be -- hydroxybenzophenone --.
Column 8, line 8 "terpenyl" should be -- terphenyl --.
Column 8, line 31 "(0.00671)mole" should be -- (0.00671 mole) --.
Column 9, line 27 "biphenylmethoxy" should be -- biphenylylmethoxy --.

Signed and sealed this 27th day of March 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
★ U.S. GOVERNMENT PRINTING OFFICE : 1969 O—366-334